United States Patent Office 3,471,418
Patented Oct. 7, 1969

3,471,418
URETHANE SPONGE PREPARED FROM CRUDE POLYISOCYANATES
Eugene A. Dickert, Buffalo, and William A. Himmler, Tonawanda, N.Y., assignors to Allied Chemical Corporation, New York, N.Y., a corporation of New York
No Drawing. Filed Mar. 24, 1965, Ser. No. 442,489
Int. Cl. C08g 22/46
U.S. Cl. 260—2.5
5 Claims This invention relates to novel cellular urethanes. More particularly it relates to flexible cellular urethanes having the irregular cell structure characteristic of marine sponges and to processes for the manufacture thereof.

It is known to make cellular urethanes by reacting in the presence of a blowing agent a polyisocyanate and an active hydrogen containing compound such as a polyalkylene ether polyol, a polyester polyol, including a polyester amide polyol, and the like. Flexible celluar urethanes are derived from diisocyanates and polyols having essentially all terminal hydroxyl groups whereas rigid cellular urethanes are derived from polyisocyanates, including diisocyanates, and polyols wherein a portion of the hydroxyl groups are other than terminal and hence take part in cross-linking reactions as well as chain extension reactions. It is conventional in the preparation of cellular urethanes to utilize catalysts to promote both chain extension and cross-linking reactions as well as the reaction between water and isocyanato groups to form carbon dioxide when water is used to supply the blowing agent. The latter reaction results in the formation of urea groups which in turn provide cross-linking sites. It is thus conventional in the preparation of flexible urethanes to utilize water as a source of the blowing agent. Tertiary amines are generally used to catalyze the water-isocyanate reaction whereas tin catalysts are generally included to accelerate the polyol-isocyanate reaction.

Polyether polyols containing tertiary amine groups are known and react with isocyanates in the presence of water. In this reaction the use of amine catalysts was said to be neither desirable nor necessary.

Complex isocyanates, that is, isocyanates derived from diamines but which have a higher amine equivalent than pure diisocyanates derived from the same diamines, due to the presence of reactive material of higher equivalent weight than the pure diisocyanate have been used to react with such amine containing polyols, but the urethanes obtained have been rigid in character. Such complex polyisocyanates presumably contain significant amounts of cross-linking materials or are of relatively low reactivity compared with the pure diiisocyanate and hence the art tended not to uitlize complex polyisocyanates for preparation of flexible urethanes especially when the polyol component was a polyether polyol. Since in most instances the complex polyisocyanates represent a more economical source of the isocyanate component while at the same time engendering unique physical characteristics in the resultant cellular urethane, it is highly desirable that methods for their utilization in the production of flexible urethane foams be provided.

It is, therefore, a principal object of this invention to devise novel flexible cellular urethanes from complex polyisocyanates.

Another object is to devise novel flexible cellular urethanes having the irregular cell structure of marine sponge.

Still another object is to provide a process for the manufacture of flexible cellular urethanes from complex polyisocyanates and tertiary amine containing polyalkylene-ether polyols.

Other objects will be obvious from the following description of our invention.

We have made the surprising discovery that flexible cellular urethanes having an irregular cell structure similar to marine sponge can be obtained by a one-shot process comprising admixing the following materials:

(a) water
(b) a tin catalyst
(c) a polyalkylene ether polyol having a functionality of 2 to 4 and a hydroxyl number in the range of about 40 to about 100, at least about 25 weight percent of such polyalkylene ether polyol containing at least one tertiary amino group; and
(d) a complex organic polyisocyanate having an amine equivalent of at least 90 to about 135 and selected from the group consisting of undistilled phosgenation products of tolylene diamines and methylene-bis-anilines.

The resultant cellular urethanes have not only the irregular cell structure of the marine sponge but also the color of this natural material. Also, the cellular urethanes are flexible in character and hence represent an economical and effective substitute for the natural product.

The complex organic polyisocyanates are well known and are generally used for the production of rigid cellular urethane structures. They are probably quite complex mixtures of organic polyisocyanates although they contain significant amounts of the organic diisocyanate corresponding to the diamine from which they are derived by phosgenation.

In most instances these complex polyisocyanates are prepared by phosgenation, in the presence of a solvent, of an aromatic diamine, and thereafter removal of the solvent by distillation. None or a portion of the organic diisocyanate present is also removed by distillation depending upon the character of the complex product desired. The undistilled residue which is a complex mixture of di-, tri-, and probably higher polyisocyanates represents the product used in the process of our invention. The amine equivalent of these complex polyisocyanate compositions may be readily determined in a known manner and gives an approximation of the equivalent weight of the material per isocyanato group. For example, the equivalent weight of the diisocyanate derived from tolylene diamine is 87. If the amine equivalent of the complex polyisocyanate derived from the same diamine is determined to be 100 then 100/87=1.15 or 1.15 grams of the complex polyisocyanate is equivalent to 1 gram of tolylene diisocyanate.

Complex polyisocyanates derived from tolylene diamines are described in French Patent No. 1,375,975.

Complex polyisocyanates suitable for use in this invention can also be derived from methylene-bis-anilines, e.g. the diamines obtained by condensation of aniline or mixtures of aniline and toluidines with formaldehyde.

Complex polyisocyanates which are undistilled phosgenation products of methylene-bis-anilines have been disclosed in the prior art, e.g., British Patent 874,430 and U.S. Patent No. 2,683,730. The polyisocyanate component used is generally sufficient to provide 0.9 to 1.1, preferably 1.01 to 1.05 isocyanate groups for each hydroxyl group in the polyol and water.

The polyol component used in the preparation of the novel flexible urethanes of this invention comprises at least about 25% by weight of polyalkylene ether polyol containing at least one tertiary amino group. These polyols contain at least two but more than four hydroxyl groups and have a hydroxyl number in the range of about 40 to about 100.

The tertiary amino group containing polyols are members of a well known class of polyols and include products made by reacting vicinal alkylene epoxides with ammonia or amino compounds containing at least one primary amino group or at least two secondary amino groups. Typical of such polyols are the polyethers made by reacting ethylene oxide or 1,2-propylene oxide or mixtures thereof, with ammonia, or aliphatic or cycloaliphatic primary or secondary amines. As examples of the compounds from which these polyethers may be made are for example methyl amine, cyclohexylamine, hexamethylene diamine, ethylene diamine, t-butyldiethanol amine, ethanolamine and the like.

These polyols may be made by methods well known in the art. The reaction of the amine with the vicinal alkylene epoxide or mixture thereof may be effected in one or several stages. Thus, for example an intermediate product may be prepared by reaction of ethylene diamine with 1,2-propylene oxide and this may be further reacted with ethylene oxide or 1,3-propylene oxide. The condensation may produce one or a mixture of polyols depending upon the conditions under which the reaction is carried out.

A general method of synthesis applicable to this class of polyols is that in which an aqueous or alcoholic solution of the amino compound is reacted with the vicinal epoxide at a moderate temperature, e.g., 60° to 80° C. and under moderate pressure e.g., 5 to 10 p.s.i. Thereafter, to the resulting hydroxyalkyl amine and alkalene catalyst, e.g. potassium hydroxide, is added, the solvent removed, and additional epoxide reacted with the intermediate compound at elevated temperature, usually above 100° C., and pressure, usually in excess of 20 p.s.i., until a polyether polyol of the desired hydroxyl number is obtained.

Mixtures of these amino group containing polyalkylene ether polyols with conventional polyether polyols, such as propylene glycol or glycerine initiated polyoxypropylene diols or triols, can be used also. In such mixtures at least 25% by weight of the mixture should be the amino group containing polyalkylene ether polyol.

We have found that a tin catalyst is required in the novel process of our invention. Such compounds are well known in this art and two types of tin catalysts are available:

(1) Organo-tin compounds of the general formula

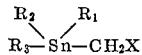

wherein $CH_2X$ represents a hydrocarbon alkane radical of 1 to 18 carbons; $R_1$, $R_2$ and $R_3$ represent hydrocarbon alkane radicals of 1 to 18 carbons, hydrogen, halogen, or hydrocarbon acyloxy radicals, $R_1$, $R_2$ and $R_3$ being alike or different and further two members of the group, $R_1$, $R_2$ and $R_3$, together may be oxygen or sulfur. Representative members of this class of compounds include the following:

Tetramethyltin
Tetra-n-butyltin
Tetra-n-octyltin
Dimethyldioctyltin
Di-n-butyltindichloride
Dilauryltindifluoride
2-ethylhexyltintriiodide
Di-n-octyltin oxide
Di-n-butyltin diacetate
Di-isobutyltin-bis-(monobutylmaleate)
Di-2-ethylhexyltin-bis-(2-ethylhexanoate)
Tri-n-butyltin acetonate
Dibutyltin distearate
Dibutyltin dilaurate (2) Organo-tin salts such as stannous octoate and stannous oleate.

The preferred members of these classes of tin catalysts are dibutyltin dilaurate and stannous octoate because of their effectiveness an their ready availability.

The various members of these classes of tin compounds, as is known, vary considerably in their effectiveness as catalysts for the reaction between the hydroxyl groups of the polyether polyol and the isocyanato groups of the complex polyisocyanate. Moreover, we have found that in general larger amounts of the tin catalyst are desirable than are normally used in more conventional flexible foam formulations. Thus, whereas in a flexible urethane derived from 100 parts of a polyoxypropylene triol of 56 hydroxyl number and about 47 parts of tolylene dissocyanate less than 0.5 part (all parts are by weight) of stannous octoate are required, in the novel process of our invention we prefer to use 1.0 part to 4 parts or more of tin catalyst per 100 parts polyol. Mixtures of the two classes of tin catalysts may be used also.

The novel flexible cellular urethanes of this invention are primarily water blown structures in which water by reaction with the complex polyisocyanate component produces carbon dioxide. If desired, auxiliary blowing agents, e.g., methylene chloride, fluorinated hydrocarbons such as monofluorotrichloromethane, dichlorodifluoromethane etc., may be added.

The amount of water supplied may be sufficient to provide all the blowing agent required or may be employed in lesser amount supplemented by an auxiliary blowing agent, as noted. The proportion of water can vary from about 2 parts to about 6 parts per 100 parts of polyol, and preferably from 3 to 4 parts per 100 parts of polyol are provided.

Although it is now conventional to include an emulsifying agent, and particularly a silicone surfactant in the preparation of cellular urethanes, we have found that emulsifying agents and particularly silicone surfactants are not required. When included, we have found that the amount used should be controlled, generally in amount of less than 0.4 part per hundred parts by weight polyol, in view of the effect of such ingredients upon the cell size and structure of cellular urethanes. In view of the relative high cost of these silicone surfactants, and the care which must be exercised where they are used, we prefer to avoid using silicone surfactants in this novel process.

The more detailed practice of the present invention will be illustrated by the following examples in which parts and percentages are by weight and temperatures are given in degrees centigrade.

EXAMPLE 1

A mixture of 2 parts of dibutyltindilaurate, 7 parts of water and 200 parts of an ethylene diamine initiated polyoxypropylene tetrol having a hydroxyl number of 67.8, containing about 70% primary hydroxyl groups, was vigorously mixed and to it were added 113 parts of a complex diisocyanate having an amine equivalent of 107.3 and being essentially an undistilled phosgenation product of an 80%-20% mixture of 2,4- and 2,6-toluene diamines. The resultant mass was agitated for about 30 seconds and then the foaming mass was poured into a suitable mold, wherein it was permitted to rise unhindered. The resultant cellular structure was aged for about 24 hours at ambient temperature. The product was a flexible cellular urethane having an irregular cell structure and color similar to that of marine sponge.

EXAMPLE 2

The process described in Example 1 above was repeated except that 200 parts of a glycerin initiated polyoxypropylene triol having a hydroxyl number of 56 was substituted for the amino group containing polyoxyalkylene polyol used in that example. The resulting mixture collapsed while foaming.

EXAMPLE 3

A mixture of 3.5 parts of water, 3 parts of stannous octoate, 0.5 part of dibutyltin dilaurate and 100 parts of a t-butyldiethanolamine initiated polyoxypropylene diol having a hydroxyl number of 61.7 was agitated vigorously during the addition of 52.6 parts of a complex diisocyanate composition having an amine equivalent of 107.7 and being essentially an undistilled toluene diamine phosgenation product. The mixture was agitated vigorously for about 30 seconds and then poured into a suitable mold wherein it was permitted to rise freely. The cellular urethane was aged for about 24 hours at ambient temperature. The resulting product had an irregular cellular structure like marine sponge.

EXAMPLE 4

A mixture of 100 parts of a propylene glycol initiated polyoxypropylene glycol having a hydroxyl number of 56, 100 parts of a triethanolamine initiated polyoxypropylene trial having a hydroxyl number of 56, 6 parts of water, 6 parts of dibutyltin dilaurate and 0.45 part of silicone oil surfactant was vigorously mixed during the addition of 96.5 parts of the complex diisocyanate composition used in Example 3 above. The mass was agitated for about 30 seconds and then poured into a mold. The foam product after aging for about 24 hours at ambient temperature had the color and irregular cell structure of marine sponge.

EXAMPLE 5

A mixture of 150 parts of the dial and 50 parts of the amino group containing trial used in Example 4 above, 6 parts of water and 6 parts of dibutyl tin dilaurate was agitated vigorously during the addition of 116 parts of a complex diisocyanate composition having an amine equivalent of 135.2 and being the undistilled phosgenation product of crude 4,4'-methylenedianiline (prepared according to U.S. Patent 2,683,730). The mass was poured into a suitable mold and the resulting flexible cellular urethane had the irregular cell structure of marine sponge.

It can thus be seen that a novel and effective means has been devised to prepare flexible cellular urethanes which have the appearance and irregular cell structure of marine sponge. Inasmuch as the natural product is somewhat expensive and gradually disappearing from the market place, this synthetic product assumes an economically important stature.

Our invention has been described and illustrated by reference to specific embodiments thereof. While the illustrative examples include our preferred procedures, it should be distinctly understood that variations in these procedures are possible and that many such variations will be obvious to those skilled in this art in view of the disclosures contained herein. For example the polyol component may contain primary hydroxy end groups resulting from the "capping" of the secondary hydroxyl end groups with ethylene oxide, which as is well known increases the reactivity of the polyol with the complex polyisocyanate component. Further, the cellular urethane may contain pigments, fillers, and the like additives which are conventionally included in many similar formulations for flexible urethanes.

We claim:
1. A one-shot process for preparing flexible cellular urethanes having an irregular cell structure and color of marine sponge comprising admixing
   (a) water;
   (b) a tin catalyst in an amount of 1 part to 4 parts per 100 parts of polyol used and in the absence of surfactant;
   (c) a polyalkylene ether polyol having a functionality of 2 to 4, and a hydroxyl number within the range of about 40 to about 100, at least about 25% by weight of said polyol containing a tertiary amino group; and
   (d) a complex organic polyisocyanate composition having an amine equivalent of at least about 90 and selected from the group consisting essentially of an undistilled phosgenation product obtained by reacting a toluene diamine or methylene-bis-aniline with phosgene in the presence of a solvent followed by removal of said solvent.

2. A one-shot process for preparing flexible cellular urethanes having an irregular cell structure and color of marine sponge comprising admixing
   (a) water;
   (b) a tin catalyst in an amount of 1 part to 4 parts per 100 parts of polyol used and in the absence of surfactant;
   (c) a polyalkylene ether polyol having a functionality of 2 to 4, and a hydroxyl number within the range of about 40 to about 100, at least about 25% by weight of said polyol containing a tertiary amino group; and
   (d) a complex organic polyisocyanate composition having an amine equivalent of at least about 90 and consisting essentially of the undistilled phosgenation product obtained by reacting 2,4- and 2,6-toluene diamines with phosgene in the presence of a solvent followed by removal of said solvent.

3. A process as claimed in claim 1 wherein the proportion of water is from about 2 parts to about 6 parts per 100 parts of polyol.

4. A flexible cellular urethane having an irregular cell structure and color characteristic of marine sponge produced by a one-shot process of admixing
   (a) water;
   (b) a tin catalyst in an amount of 1 part to 4 parts per 100 parts of polyol employed and in the absence of surfactant;
   (c) a polyalkylene ether polyol having a functionality of 2 to 4, and a hydroxyl number within the range of about 40 to about 100, at least about 25% by weight of said polyol containing a tertiary amino group; and
   (d) a complex organic polyisocyanate composition having an amine equivalent of at least about 90 and consisting essentially of the undistilled phosgenation product obtained by reacting 2,4- and 2,6-toluene diamines with phosgene in the presence of a solvent followed by removal of said solvent.

5. A flexible cellular urethane having an irregular cell structure and color characteristic of marine sponge produced by a one-shot process of admixing
   (a) water;
   (b) a tin catalyst in an amount of 1 part to 4 parts per 100 parts of polyol used and in the absence of surfactant;
   (c) a polyalkylene ether polyol having a functionality of 2 to 4, and a hydroxyl number within the range of about 40 to about 100, at least about 25% by weight of said polyol containing a tertiary amino group; and
   (d) a complex organic polyisocyanate composition having an amine equivalent of about 135 and consisting essentially of an undistilled phosgenation product obtained by reacting phosgene with methylene-bis-aniline in the presence of a solvent followed by removal of said solvent.

References Cited

UNITED STATES PATENTS

| | | | |
|---|---|---|---|
| 2,683,730 | 7/1954 | Seeger et al. | 260—453 |
| 2,953,533 | 9/1960 | Khawam | 260—2.5 |
| 3,042,631 | 7/1962 | Strandskor | 260—2.5 |
| 3,067,150 | 12/1962 | Dombrow et al. | 260—2.5 |
| 3,097,191 | 8/1963 | France et al. | 260—77.5 |
| 3,201,358 | 7/1965 | Hostettler et al. | 260—2.5 |
| 3,215,652 | 11/1965 | Koplan | 260—2.5 |
| 2,726,219 | 12/1955 | Hill | 260—2.5 |
| 3,072,582 | 1/1963 | Frost | 260—2.5 |
| 3,206,416 | 9/1965 | Dahm | 260—2.5 |

FOREIGN PATENTS

| | | |
|---|---|---|
| 1,241,345 | 8/1960 | France. |
| 874,430 | 8/1961 | Great Britain. |
| 1,375,975 | 9/1964 | France. |
| 916,745 | 1/1963 | Great Britain. |

DONALD E. CZAJA, Primary Examiner

M. J. WELSH, Assistant Examiner